May 19, 1970   A. LINK   3,512,847

BEARING FOR AN AIRCRAFT WING HAVING ADJUSTABLE SWEEPBACK

Filed Nov. 29, 1967

United States Patent Office 3,512,847
Patented May 19, 1970

1

3,512,847
BEARING FOR AN AIRCRAFT WING HAVING ADJUSTABLE SWEEPBACK
Anton Link, Furstenfeldbruck, Germany, assignor to Entwicklungsring Sud G.m.b.H., Munich, Germany
Filed Nov. 29, 1967, Ser. No. 686,546
Claims priority, application Germany, Dec. 22, 1966, E 33,080
Int. Cl. F16c 11/00; B25g 3/38; B64c 3/38
U.S. Cl. 308—2                                          2 Claims

ABSTRACT OF THE DISCLOSURE

The invention concerns a bearing structure for securing the wing of an aircraft to the fuselage thereof so as to permit relative movement between the fuselage and the wing for adjustment of wing sweepback. The bearing includes a bifurcated wing support stub projecting from the fuselage of the aircraft. Disposed between the prongs of the stub is a spacing washer. Positioned between each of the surfaces of the spacing washer and the adjacent surfaces of the wing stub are bearing washers. The washers and the spacing disc are secured to the support stub by suitable means. The base of the wing is formed to define a circular opening therethrough having a diameter slightly greater than the diameter of the disc. The disc is positioned within the opening defined by the base of the wing so as to captively retain the wing base between the prongs of the bifurcated support stub.

Background of the invention

This invention relates to a bearing particularly adapted for securing to the fuselage of an aircraft wings having an adjustable sweepback feature and more particularly relates to a bearing which facilitates rotation of the wings of an aircraft about an axis generally normal to the plane of the wings so as to permit adjustment of the angle of sweepback.

Aircraft wings having the provision of an adjustable sweepback feature are frequently utilized in the construction of high-performance aircraft. The velocity range of such aircraft is quite extensive, ranging from very slow to extremely high flight speeds. To permit increase in the wing load during high speed cruising the wing sweepback is preferably adjustable to the maximum degree, thereby decreasing the wing spread and the wing area. During very low flying speeds such as occur during take-off and landing, the wing sweepback is preferably adjusted in a decreasing manner, or frequently, to a negative amount. Simultaneously with the adjustment of the sweepback feature, it is preferable to increase the wing spread and the effective wing area so as to produce a minimum wing load.

To permit adjustment of the sweepback of the wings with respect to the fuselage of the aircraft, bearings are usually provided which secure the base of the wing to the fuselage. Such bearings are under a considerable stress produced by axial and radial forces subjected thereupon by the wing during flight. Heretofore, spherically-shaped bushings have been frequently used to facilitate relative movement between the wings and the nacelle of the aircraft. Such bushings have not been entirely satisfactory due to the inadequate force distribution over their area which creates extreme load conditions upon the spherical surfaces of the bearings. Alternately, various other types of bearings have been utilized such as sleeve bearings and roller bearings. Such bearings, however, have been found to be relatively difficult and cumbersome to install.

The bearing structure of the illustrated embodiment greatly reduces the difficulties experienced with previous bearing means and provides a relatively simple and effective means for securing the wing to the fuselage of the aircraft so as to permit adjustment of the wing sweepback while still maintaining a lightweight structure. The bearing of the illustrated embodiment more adequately equalizes the load distribution throughout the connecting member, thereby reducing the occurrence of localized stresses. The illustrated bearing structure permits the transmission of those forces acting upon the wing to the fuselage of the aircraft in a manner which eliminates the occurrence of overload situations.

In accordance with the illustrated embodiment, an aircraft wing is supported by a pair of bearings each of which includes a forked or bifurcated support arm secured to the fuselage of the aircraft. Slidably between the forks of each support arm are relatively large flat washers parallel and spatially disposed. The washers serve to receive and to transmit the transverse forces from the wing to the support arms. Positioned between the washers is a substantially flat disc. The stub of the wing is formed to provide a pair of integral, spaced, parallel bearing members which are positioned to surround the disc member and which are captively maintained by the prongs of the bifurcated support arm.

Other features of the illustrated embodiment will become apparent through reference to the following description and accompanying drawing which shows an illustrative embodiment of this invention.

Description of the preferred embodiment

Figure 1:
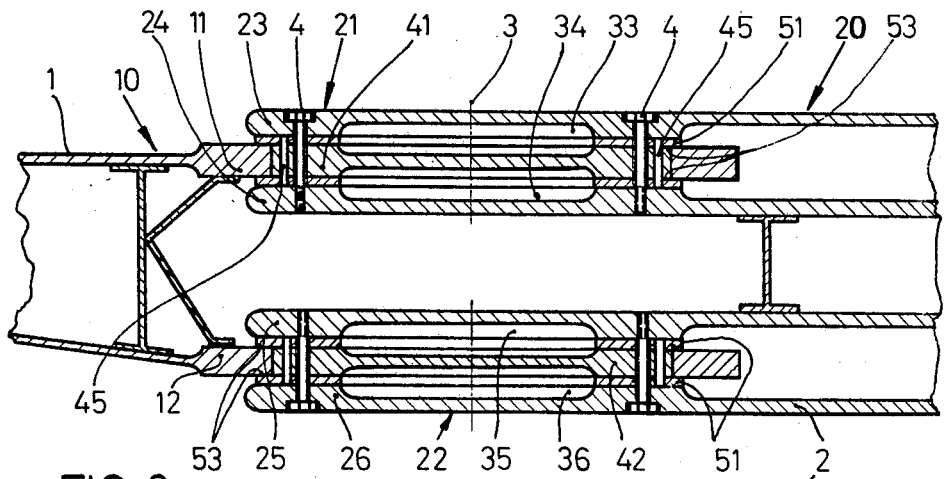
FIG. 1 is a top fragmentary view of an aircraft wing secured to the fuselage of an aircraft by means of a bearing embodying certain features of this invention.

Referring particularly to FIG. 1, the illustrated embodiment comprises a support stub 2 which is formed integral with the fuselage of the aircraft and projects outwardly therefrom. The base of a wing 1 is provided with a pair of integral parallel disposed support members 10 which are detachably secured to the wing stub 2 by means of a pair of identical parallel disposed bearings 20 and 20a. By means of the bearings 20 and 20a, the wing is rotatable about an axis of rotation 3. Each of the bearings 20 and 20a includes bifurcated parallel disposed bearing races 23, 24, and 25, 26, respectively. Machined on the inwardly disposed adjacent surfaces of each pair of races 23, 24 and 25, 26 are disc-shaped recesses 33, 34, and 35, 36, respectively. Further, positioned between the adjacent surfaces of each pair of bearing races are spacing discs 41 and 42 secured there between in a manner to be further described. The respective bearing disc are fastened to the races 23, 24, 25 and 26 by assembly bolts 4, and the wing stubs 11 and 12 are each provided with a circular opening with a diameter slightly greater than the maximum diameter of the discs 41 and 42 so as to permit free movement thereabout.

Sandwiched between the adjacently disposed surfaces of the support arms 23, 24, 25 and 26 and their respective spacer discs 41 and 42 are washers 51 displaying bearing surfaces 53. The washers 51 are adapted to receive and transmit transverse forces from the wing stubs 11 and 12 to the support stub 2.

The creation of frictional forces within the bearings is kept to a minimum, since the circular openings in the wing stubs 11 and 12 as well as the vertical sliding surfaces of the discs 41 and 42 can easily be polished or may become abraded through use.

The washers 51 which receive and transmit the transverse forces may be finished precisely at only one surface, namely that face which is in sliding contact with the surface of the wing stubs 11 and 12, since the sliding resistance occurs predominately only at the surfaces 53 adjacent the stubs 11 and 12.

By means of the illustrated embodiment, the transmission of forces from the wing through the bearing to the fuselage is optimized. Any slackness of the bearing can easily compensated by adjustment of the assembly bolts 4. If desired, the assembly bolts 4 may be loosened and the wing repositioned in any desired sweepback position without requiring a disassembly of the bearing itself. The washers 51 are adapted to be secured to the spacing discs 41 and 42 by means of set pins 45 or other suitable means. Should it be desired to dismount the wing 1, the set pins obviate the necessity of completely disassembling the washers from the wing. Such dismounting being accomplished by merely removing the bolts 4. The relatively large circumferential surface area of the spacing discs 41 and 42 about which the wing is rotated during adjustment of its sweepback serves to keep the load on the inner surface of the wing support members 11 and 12 to a minimum. It will be readily appreciated that the bearing according to the illustrated embodiment can be fabricated in a relatively simple and efficient manner.

Figure 2:
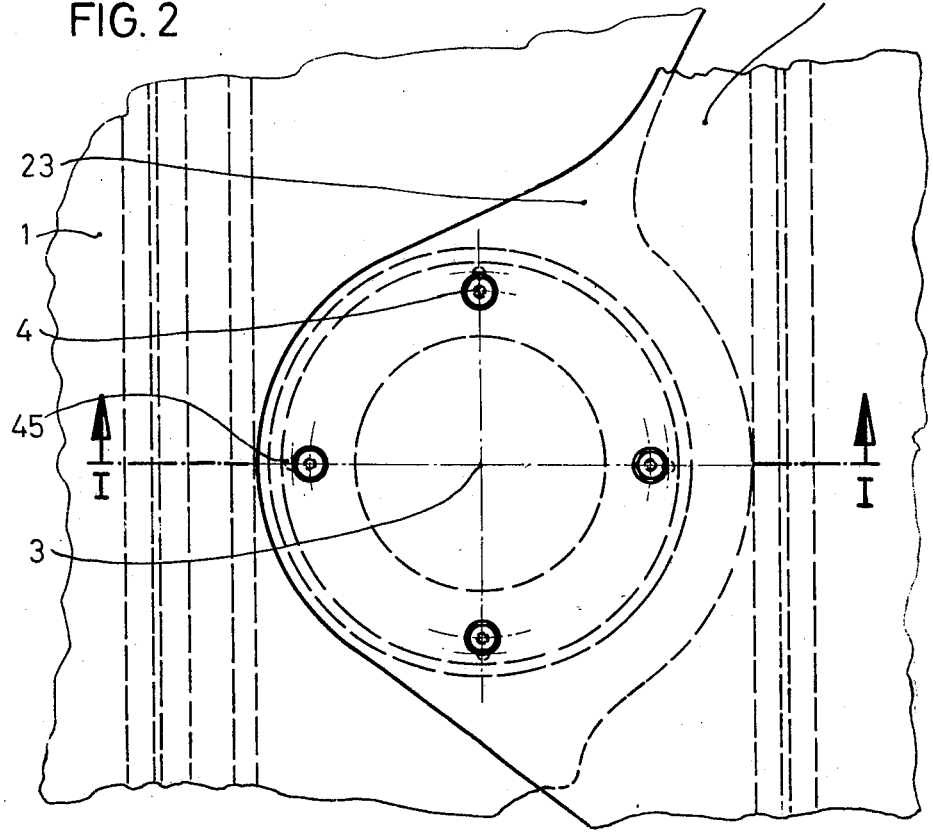
FIG. 2 is a sectional view of the bearing illustrated in FIG. 1 taken substantially along the line I—I.

In accordance with the illustrated embodiment, each of the wings are supported by two similar bearings, as illustrated in FIG. 2. The bearings are positioned parallel and assure a symmetry with respect to both bearings so that the load is approximately equally distributed between the bearings. The bearings together with the mounting holes through which the bolts 4 pass are aligned so that the holes may be drilled during construction simultaneously, which is a great advantage during manufacture.

Conventional bearings, which include spherical bearing surfaces, display the disadvantage in that the surfaces must be adapted to receive not only the transverse forces, but also those forces resulting from impact of the bending moments which are normal to the axis of rotation. This feature results in the creation of considerable pressures on the sliding surfaces and complicates their lubrication. Such disadvantages have been substantially overcome by the illustrated embodiment.

The bearing of the illustrated embodiment provides a means whereby the forces transmitted from the bending moment of the wing to the bearing itself act only as a surface pressure to the vertical surfaces of the openings in the bearing discs 11 and 12. Furthermore, the forces are directed parallel to the axis of rotation and transmitted to the surfaces as pressures only by means of the washers 51 which receive and transmit substantially only the transverse forces. This constructional feature facilitates the manufacture of the various bearing components since high degrees of tolerance are not required. Furthermore, the bearing surfaces in accordance with the illustrated embodiment can easily be adapted for the inclusion of self-lubricating plastic films, as is readily apparent.

Although but one preferred embodiment of the invention has been described in detail, it is to be understood that various changes, substitutions, and alterations can be made therein without departing from the spirit and scope of the invention an defined by the following claims.

I claim:
1. A bearing to facilitate rotation of an aircraft wing about an axis substantially normal to the plane of said wing with respect to the fuselage of the aircraft comprising at least one bifurcated arm defining substantially flat, parallel disposed races, a pair of flat washers disposed between the facing surfaces of said races and parallel to each other, a relatively flat, circular disc disposed between said washers and a bearing member defining a circular opening therethrough, said circular opening being of a diameter slightly larger than the diameter of said disc to permit free movement thereabout, said bearing member being positioned so as to encircle the circumferential periphery of said disc, the major diameter of each of said washers exceeding the outer diameter of said opening defined by said annual bearing member and at least one fastener serving to secure said bifurcated arm securely to said washers and said disc so as to prevent relative movement therebetween.

2. A bearing in accordance with claim 1 comprising at least one additional fastener being positioned to secure said washers to said disc so as to prevent relative movement therebetween.

References Cited

UNITED STATES PATENTS

| 2,230,414 | 2/1941 | Piron | 287—100 X |
| 2,509,317 | 5/1950 | Schwarzkopf | 287—100 |
| 2,767,033 | 10/1956 | Wright. | |
| 2,794,608 | 6/1957 | Johnson | 244—46 |
| 3,279,721 | 10/1966 | Dethman | 308—135 X |
| 3,328,072 | 6/1967 | Adamski | 308—238 X |
| 3,355,200 | 11/1967 | Storch | 287—101 |
| 3,356,426 | 12/1967 | Fadow | 308—238 X |
| 3,383,128 | 5/1968 | Ulderup | 287—88 |
| 3,194,357 | 7/1965 | Yardley | 287—160 |
| 2,703,709 | 3/1955 | Wagner | 308—2 X |
| 3,253,671 | 5/1966 | Fielding. | |

MARTIN P. SCHWADRON, Primary Examiner

L. L. JOHNSON, Assistant Examiner

U.S. Cl. X.R.

244—46; 287—100; 308—237